Aug. 7, 1945. H. D. STEVENS 2,381,401
TIRE BUILDING APPARATUS (PLY TURN-DOWN)
Filed Oct. 7, 1944 2 Sheets-Sheet 2

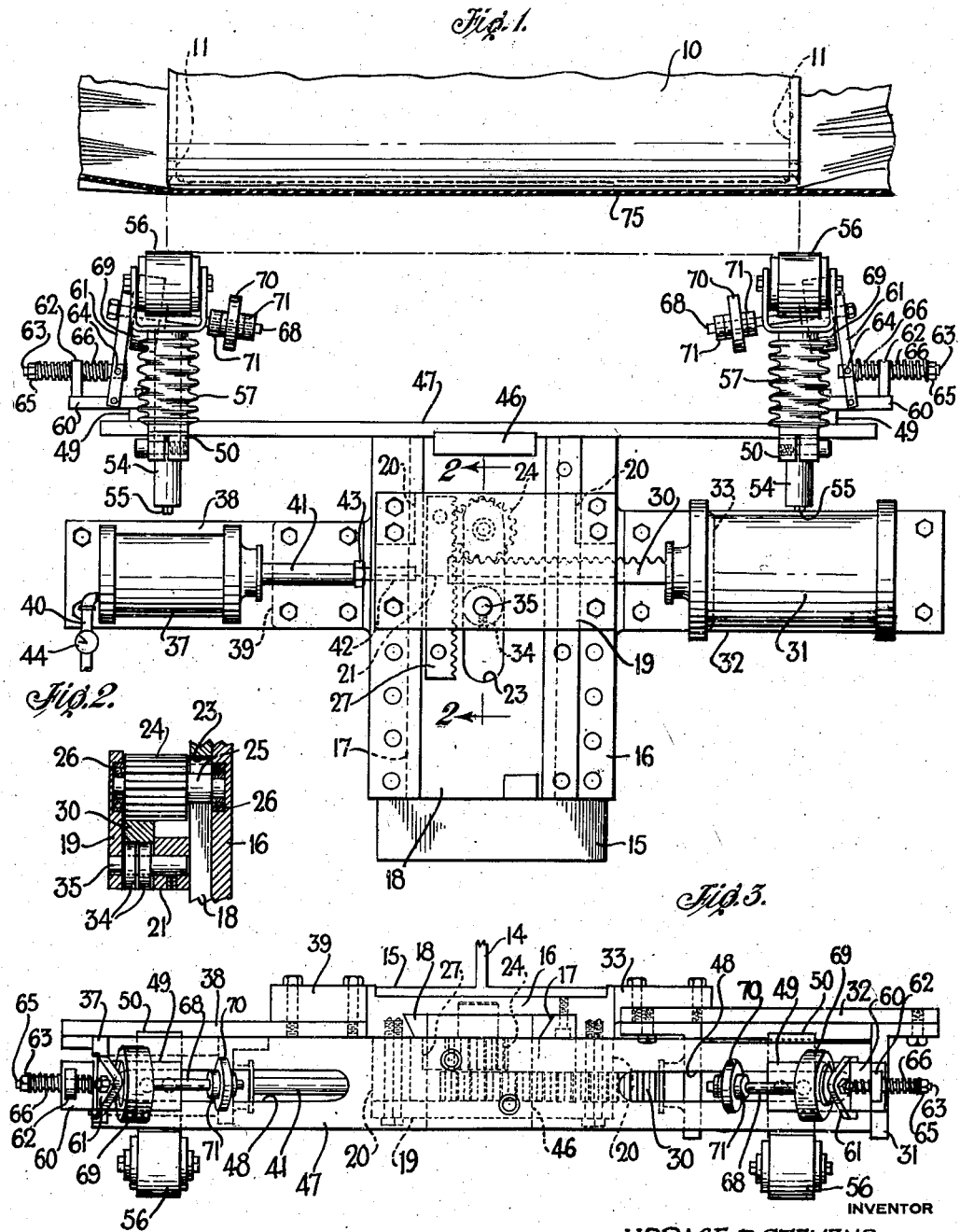

INVENTOR
HORACE D. STEVENS
BY
ATTORNEYS

Patented Aug. 7, 1945

2,381,401

UNITED STATES PATENT OFFICE 2,381,401

**TIRE BUILDING APPARATUS
(PLY TURNDOWN)**

Horace D. Stevens, Akron, Ohio, assignor to The Firestone Tire & Rubber Company, Akron, Ohio, a corporation of Ohio Application October 7, 1944, Serial No. 557,691

1 Claim. (Cl. 154—10)

This invention relates to apparatus for building the rubberized fabric carcasses or bodies of pneumatic tire casings, and more especially it relates to devices for turning fabric plies down around the shoulders or ends of a tire building form or drum during the building of a tire casing thereon.

The invention is of especial utility in the manufacture of pneumatic tire casings upon rotatable tire building forms or drums such as have relatively narrow flanges or end faces on each end thereof. Heretofore considerable difficulty has been encountered in folding or turning the under-bead plies of tire carcass fabric over and onto the said end faces of the drum, the plies being so stiff that no more than two plies could be so folded at one time. Accordingly it is one of the chief objects of the invention to provide apparatus capable of concurrently folding from four to six plies of fabric into the end-flanges of the tire building drum.

Other objects of the invention are to provide improved apparatus for progressively folding fabric plies around the ends of a tire-building drum during the fabricating of a tire casing on said drum; to provide apparatus of the character mentioned that will operate against the tire-building fabric with a wiping action; to provide fabric stitching mechanism that initially engages the work with light pressure and subsequently exerts strong pressure thereon; and to provide a fabric-stitching tool that will change its angular position with relation to the work automatically as the stitching operation progresses. Other objects will be manifest as the description proceeds.

Of the accompanying drawings:

Fig. 1 is a front elevation of apparatus embodying the invention, in inoperative position, and a fragmentary portion of the work upon which it is adapted to operate;

Fig. 2 is a section on line 2—2 of Fig. 1;

Fig. 3 is a plan view of the apparatus shown in Fig. 1;

Figure 4:
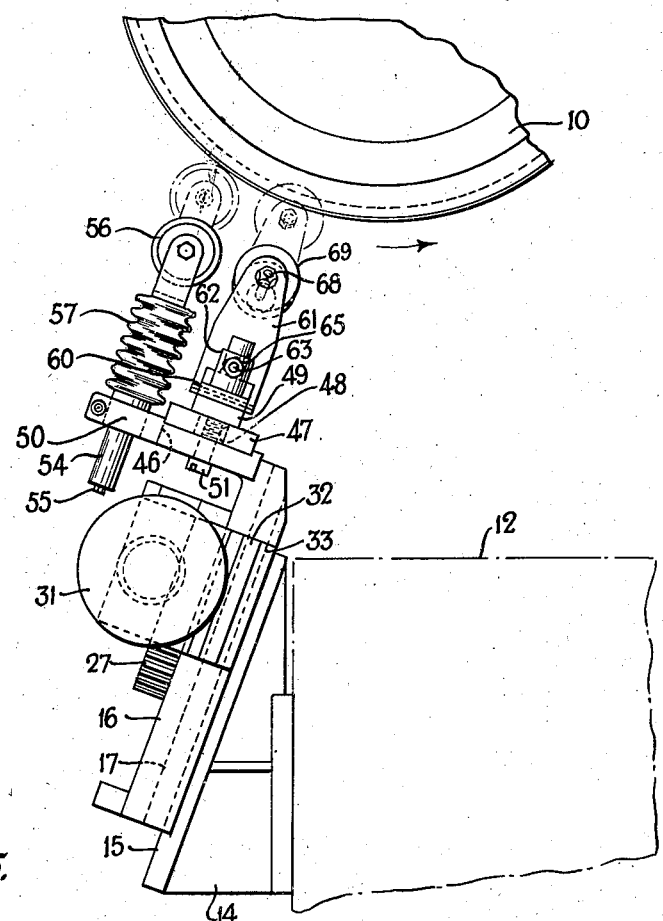
Fig. 4 is a side elevation thereof.

Referring to the drawings, there is shown at 10 a fragmentary part of a rotatable collapsible tire building form or drum that has narrow flanges or end faces at its respective bead-receiving portions, said end faces being designated 11. In other respects the drum may be of any known or preferred construction. The drum 10 is a part of a tire building machine of which only a portion of its housing, indicated in broken lines at 12, is shown herein, other portions of the machine and various mechanisms for operating upon the work, other than the present invention, being omitted for clarity of illustration.

Mounted upon the front wall of the housing 12, exteriorly thereof, is a slide bracket 14 having its forwardly presented portion 15 disposed obliquely with relation to vertical position, and fixedly secured to the front face of said oblique portion 15 is a supporting plate 16 that has its forwardly presented face formed with a dovetail slideway 17 that extends from top to bottom thereof and in which is positioned a slide 18. Spanning the slide 18 in spaced relation thereto is a bridge plate 19 that is supported by the supporting plate 16, there being respective spacer blocks 20 between plates 16, 19 at each of the upper corners of the latter, and an elongate spacer block 21 between said plates 16, 19 coextensive with the lower margin of the latter.

The slide 18 is arranged to be reciprocated longitudinally in its slideway 17, whereby it moves toward or from the drum 10. To this end said slide is centrally formed with a longitudinally extending slot 23 that is somewhat nearer to the upper end of the slide than to the lower end thereof. Positioned between the bridge plate and the slide 18 is a gear 24 that is formed with a hub or shank 25, the latter being positioned within said slot 23. Opposite ends of the gear 24 are formed with axial trunnions that are journaled in respective bearings 26, one of the latter being mounted in the bridge plate 19 and and the other in the supporting plate 16, as is clearly shown in Fig. 2. Mounted upon the front face of the slide 18, below the bridge plate 19, is a longitudinally disposed rack 27 that is meshed with the gear 24, the arrangement being such that oscillation of said gear will effect reciprocation of said slide. The thickness of the rack 27 is less than half the length of the gear 24 with the result that the rack engages only the inner end portion of the latter.

For oscillating the gear 24, the outer end portion thereof is in mesh with a rack 30 that is horizontally disposed, and in a plane that is offset from the plane of rack 27 so that it may move transversely of the latter. The rack 30 is connected to the outer end of the piston rod of a double-acting fluid pressure operated cylinder 31 that is mounted upon a cylinder base plate 32, which base plate is secured to and supported by an ear 33 that is integral with and projects laterally from the supporting plate 16. The cylinder 31 has the usual inlet and outlet pipes (not shown) connected to opposite ends thereof for effecting its operation. The rack 30 is supported and maintained in mesh with gear 24 by a pair of roller elements 34, such as ball bearings, that are positioned beneath the rack, in a recess in spacer block 21 between slide 18 and bridge plate 19, said rollers 34 being journaled on a shaft 35 that is journaled at its ends in said spacer block and said bridge plate. The arrangement is such that charging of the cylinder 31 will rotate the gear 24 in the direction that elevates the slide 18 and discharge of the cylinder reverses the operation and lowers the said slide.

In the elevating of the slide in the manner described, it is desirable that the initial movement of the slide be relatively rapid to conserve time, but thereafter its movement should be relatively slow to enable stitching tools carried by the slide to operate efficiently upon the work, as presently will be explained. To this end means is provided for yieldingly opposing the outward movement of the rack 30 as it nears the end of its stroke. Said means comprises a fluid pressure operated cylinder 37 that is disposed on a horizontal axis that is in alignment with the axis of cylinder 31. The cylinder 37 is mounted upon a cylinder base plate 38 that is attached to and supported by an ear 39 that is integral with and projects laterally from the supporting plate 16, on the opposite side of the latter from the ear 33. The cylinder 37, if desired, may be single acting as shown, and provided at its rear end with a single inlet-and-outlet pipe 40. Projecting from the forward end of the cylinder 37 is its piston rod 41, and threaded into the outer end of said piston rod is an adjusting screw 42 provided with a check nut 43. The arrangement is such that the screw 42 may be adjusted axially of the piston rod 41 so that the outer end of the screw is a determinate distance from the confronting end of the rack 30, so that the latter engages the end of said screw after being projected a determinate distance outwardly during the raising of the slide 18. The cylinder 37 is of smaller diameter than the cylinder 31, and normally is in charged condition with its piston rod in projected position as shown in Fig. 1. Thus when cylinder 31 is charged and after rack 30 engages adjusting screw 42, piston rod 41 is forced back into cylinder 37 in opposition to the pressure of the fluid therein, which fluid is forced back through the pipe 40. A choke-valve 44 may be mounted in pipe 40 to control the rate of flow of fluid in pipe 40, thus controlling the slow speed at which the rack 30 moves during the concluding phase of its projected movement.

Formed on the slide 18 at the upper end thereof is a forwardly extending bracket 46 that carries an elongate stitcher plate 47, which plate extends laterally from the bracket 46 and is parallel to the axis of tire building drum 10. The plane of the stitcher plate 47 is perpendicular to the plane of the slide 18, and also is perpendicular to a radius of the drum 10 that intersects its longitudinal centerline. Thus reciprocatory movement of the slide 18 induced by the cylinder 31 moves the stitcher plate 47 radially of the drum at its centerline. Adjacent the respective ends of the stitcher plate 47 are formed elongate slots 48, 48 disposed along the centerline of the plate, and adjustably mounted in each slot 48 is a shouldered mounting block 49. Support bars 50 are mounted on the bottom face of the plate 47, below each block 49 thereon and secured to the latter by respective cap screws 51. By means of the screws 51 the bars 50 and blocks 49 may be selectively positioned longitudinally of the slots 48.

The support bars 50 extend forwardly of the front margin of the stitcher plate 47 and each has its forward end portion formed with a split socket in which a tubular holder 54 is clamped. An axial stem 55 is slidably mounted in holder 54, the upper end of said stem being forked and having a cylindrical stitcher roller 56 journaled therein. Spring means (not shown) within the holder 54 normally urges the stem 55 upwardly so that the stitcher roller 56 is in the position shown in Figs. 1 and 4 in the inoperative position of the apparatus, said spring means yielding when pressure is applied to the roller. Resilient bellows 57 encase each holder 54 and stem 55 between the forked portions of the latter and the upper faces of the support bars 50.

Mounted atop of each block 49 is a bracket 60, which bracket is adjustable relatively of the block in the direction parallel to the centerline of the stitcher plate 47. Pivotally mounted on each bracket 60, intermediate the ends thereof, is an upwardly extending lever arm 61. Each bracket 60 has an upstanding ear 62 at its outer end, which ear is centrally apertured so as slidingly to receive a tension rod 63, the inner end of each tension rod being pivotally connected at 64 to a lever arm 61, the outer end of each tension rod being threaded and having an adjustable nut 65 mounted thereon. Compression springs 66, 66 are mounted on the tension rod 63 between the nut 65 and ear 62, and between the ear 62 and lever arm 61 respectively. The arrangement is such that by adjusting of the nut 65 the springs 66 are caused to maintain the lever arm 61 yieldingly in any desired angular position with relation to the bracket 60. The distance between the two arms 61 is somewhat greater than the length of the drum 10, and normally the arms are inclined somewhat toward each other, as shown.

The free end of each lever arm 61 carries a stitcher shaft or spindle 68 that projects laterally from the confronting sides of the arms. Journaled on each spindle 68 immediately adjacent the lever arm 68 is a relatively large stitcher roller 69. Journaled upon each spindle 68 adjacent the free or outer end thereof, in spaced relation to the roller 69, is a wheel or roller 70 that is somewhat smaller than the roller 69. The roller 70 is retained on the spindle 68 by laterally disposed collars 71, 71, and said collars and roller are adjustable longitudinally of the spindle to alter the distance between said roller and the stitcher roller 69 when desired.

By means of the slots 48 in stitcher plate 47, the two stitcher groups, each comprising the stitcher roller 56 and the rollers 69, 70, may be adjusted toward or from the central plane of the apparatus to adapt the latter to cooperation with building drums 10 of different lengths. Furthermore, rollers 70 of different diameter may be supplied when drums 10 of different diameter are used, for example, a roller 70 of smaller diameter would be employed if a drum of the diameter indicated by broken lines in Fig. 1 was used.

In the operation of the apparatus, the drum 10 is rotated in the direction indicated by the arrow in Fig. 4, and the under-bead fabric plies 75 of a tire casing are applied thereto in the usual manner, the marginal portions of the plies extending well beyond the respective ends of the drum, as shown. Although for simplicity of illustration these plies are shown as a single ply in Figs. 1 and 5 of the drawings, it will be understood that they may be as many as five or six in number. After the plies 75 have been smoothly applied to the drum and as the latter continues to rotate, the rear end of cylinder 31 is charged and projects its piston rod to move rack 30 outwardly, to the left as viewed in Figs. 1 and 3, thereby moving slide 18 and the stitcher elements carried thereby upwardly from the inoperative positions shown in full lines in Figs. 1 and 4, toward the operative positions shown in Fig. 5 and in broken lines in Fig. 4. Initial rising movement of the slide 18 is rapid, but thereafter is relatively slow as the movement of the rack 30 is retarded by the pressure in the cylinder 37, after said rack has engaged adjusting screw 42 of piston rod 41. The rising movement of the slide should slow down at about the same time the first of the stitcher units engage the work. The construction and arrangement of the apparatus is such that the first stitcher units to engage the work are the stitcher rollers 56. They engage the fabric plies 75 at opposite ends of the periphery of the drum and press said plies firmly against said drum. Said rollers extend slightly beyond the ends of the drum and serve to stabilize the fabric plies as the latter are engaged subsequently by other stitcher units. The rollers 56 do not change their positions with relation to the work as they operate thereon, and their mountings yield readily as the slide 18 continues to rise.

Figure 5:
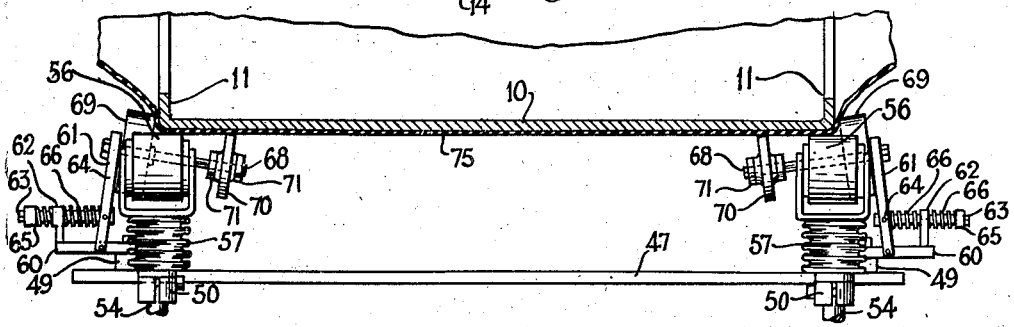
Fig. 5 is a fragmentary front elevation of the apparatus, and a fragmentary section of the work, the apparatus being shown substantially in the final phase of operation upon the work.

Next, the stitcher rollers 69, which are moving radially toward the drum, engage the overhanging unsupported skirt portions of the fabric plies 75 immediately beyond the respective ends of the drum, and turn said plies down, that is, radially inwardly of the drum, until said plies attain the positions substantially as shown in Fig. 5. This occurs before the wheels or rollers 70 engage the work, and since pivotal movement of the lever arms 61 that carry said stitcher rollers 69 is opposed only by the light springs 66, it will be apparent that the rollers 69 exert only light pressure upon the work at this time. As the rollers 69 continue to rise, the rollers 70 come into contact with the work, laterally inwardly from the ends of the drum, with the result that, through the agency of the spindles 68, force is applied to the free ends of lever arms 61 to effect pivotal movement thereof that moves the stitcher rollers 69 carried thereby toward the drum 10. Such movement of the lever arms changes the angular positions of the rollers 69 with relation to the drum, so that the flat lateral faces of the latter wipe the overhanging skirt portions of the fabric plies 75 against the bead-receiving end faces 11 of the drum with substantial pressure. The rollers 69 reach their maximum elevation when the slide 18 reaches the upper limit of its movement.

Thereafter the cylinder 31 is reversed to lower the slide 18 and withdraw the stitching tools from. This completes a cycle of operation of the ply turn-down device, which is not repeated until the tire casing on the drum is completed and removed, and the construction of another begun.

The invention is simple in its construction and operation, and operates in a facile and efficient manner to perform a tire-building operation that heretofore has been somewhat difficult of accomplishment.

Modification may be resorted to without departing from the spirit of the invention or the scope thereof as defined by the appended claim.

What is claimed is:

In tire building apparatus of the character described, the combination of fabric-stitching tools for operating upon the fabric tire plies on a rotatable tire building drum, a slide reciprocable radially of said drum and supporting said tools, rack and gear means for reciprocating said slide, a fluid pressure operated cylinder operatively connected to said rack for actuating the same, and a second fluid pressure cylinder or smaller capacity than the first mentioned cylinder and mounted in axial alignment therewith, said second cylinder having its piston rod normally in projected position and adapted to engage and oppose the movement of the said rack during slide-raising movement of the latter.

HORACE D. STEVENS.